US012633506B2

(12) United States Patent
Vadillo et al.

(10) Patent No.: US 12,633,506 B2
(45) Date of Patent: May 19, 2026

(54) HEAT TRANSFER USING IONIC PUMPS

(71) Applicant: Ventiva, Inc., Fremont, CA (US)

(72) Inventors: Rudy Vadillo, Gilroy, CA (US); Carl Paul Schlachte, Ben Lomond, CA (US); Himanshu Pokharna, Saratoga, CA (US)

(73) Assignee: Ventiva, Inc., Fremont, CA (US)

( * ) Notice: Subject to any disclaimer, the term of this patent is extended or adjusted under 35 U.S.C. 154(b) by 81 days.

(21) Appl. No.: 17/735,076

(22) Filed: May 2, 2022

(65) Prior Publication Data

US 2022/0344137 A1 Oct. 27, 2022

Related U.S. Application Data

(63) Continuation of application No. PCT/US2022/025845, filed on Apr. 21, 2022.

(60) Provisional application No. 63/210,887, filed on Jun. 15, 2021, provisional application No. 63/179,135, filed on Apr. 23, 2021.

(51) Int. Cl.
*H01J 41/12* (2006.01)
*F28F 13/16* (2006.01)

(52) U.S. Cl.
CPC .............. *H01J 41/12* (2013.01); *F28F 13/16* (2013.01); *F28F 2250/08* (2013.01)

(58) Field of Classification Search
CPC ........ H01J 41/12; F28F 13/16; F28F 2250/08; F28F 2255/02
USPC ...................................................... 417/50, 49
See application file for complete search history.

(56) References Cited

U.S. PATENT DOCUMENTS 3,312,840 A 4/1967 Dennis
3,665,241 A 5/1972 Spindt et al.
4,220,195 A 9/1980 Borgoyn et al.
5,071,526 A 12/1991 Pletcher et al.
(Continued)

FOREIGN PATENT DOCUMENTS

CN 110708918 A 1/2020
JP H02192595 A 7/1990
(Continued)

OTHER PUBLICATIONS

Climalife. "R-134a." Datasheet, Climalife Dehon Service SA, 2015, 2 pages, [Online] [Retrieved Nov. 1, 2022], Retrieved from the Internet <URL:https://climalife.dehon.com/uploads/product/media/document/r134a-fd-en-15.pdf>.
(Continued)

*Primary Examiner* — Philip E Stimpert
(74) *Attorney, Agent, or Firm* — Wilson Sonsini Goodrich & Rosati

(57) ABSTRACT

Heat transfer devices are based on using one or more ionic pumps to circulate a dielectric working fluid around a closed circulation path, which may be contained in a conduit. The working fluid may be a liquid or a gas. The ionic pumps are disposed along the closed circulation path. The pumps include an emitter and collector. When a voltage is applied to the emitter, the working fluid is ionized at the emitter. The ionized fluid is drawn electrostatically to the lower-voltage collector, which, through collision with molecules that in turn impart their momentum, creates a flow of the working fluid. This approach may be used with either positive or negative corona devices.

19 Claims, 10 Drawing Sheets

(56) References Cited

U.S. PATENT DOCUMENTS

| | | | | |
|---|---|---|---|---|
| 5,210,940 | A | 5/1993 | Kawakami et al. | |
| 6,101,994 | A | 8/2000 | Ichikawa | |
| 6,900,077 | B2 | 5/2005 | Akram | |
| 7,279,846 | B2 * | 10/2007 | Gofuku | H01J 7/14 313/496 |
| 10,978,881 | B2 | 4/2021 | Schlachte et al. | |
| 2002/0075655 | A1 | 6/2002 | Chen et al. | |
| 2002/0122728 | A1 * | 9/2002 | Darabi | H02N 1/008 417/48 |
| 2005/0068726 | A1 | 3/2005 | Pleskach et al. | |
| 2006/0169441 | A1 | 8/2006 | Schlitz | |
| 2006/0203416 | A1 | 9/2006 | Taylor et al. | |
| 2007/0034356 | A1 | 2/2007 | Kenny et al. | |
| 2009/0056916 | A1 | 3/2009 | Yesin et al. | |
| 2009/0084335 | A1 | 4/2009 | Goldin et al. | |
| 2009/0195983 | A1 | 8/2009 | Reichert et al. | |
| 2009/0260782 | A1 | 10/2009 | Whitney et al. | |
| 2009/0308081 | A1 | 12/2009 | Ouyang et al. | |
| 2010/0116464 | A1 | 5/2010 | Jewell-Larsen et al. | |
| 2010/0177519 | A1 | 7/2010 | Schlitz | |
| 2010/0203273 | A1 | 8/2010 | Holland et al. | |
| 2011/0084611 | A1 | 4/2011 | Schlitz et al. | |
| 2011/0094710 | A1 | 4/2011 | Choudhary et al. | |
| 2011/0102963 | A1 | 5/2011 | Sekoguchi | |
| 2011/0116205 | A1 | 5/2011 | Schlitz | |
| 2011/0261499 | A1 | 10/2011 | Hizer et al. | |
| 2011/0274459 | A1 | 11/2011 | Sugiyama | |
| 2011/0292560 | A1 | 12/2011 | Jewell-Larsen et al. | |
| 2011/0308768 | A1 | 12/2011 | Schwiebert et al. | |
| 2012/0002342 | A1 * | 1/2012 | Lee | H01T 23/00 361/231 |
| 2012/0007742 | A1 | 1/2012 | Gooch et al. | |
| 2012/0008249 | A1 | 1/2012 | Sawyer et al. | |
| 2012/0057356 | A1 | 3/2012 | Hizer et al. | |
| 2012/0097028 | A1 | 4/2012 | Lee | |
| 2012/0120542 | A1 | 5/2012 | Zhang et al. | |
| 2012/0121487 | A1 | 5/2012 | Jewell-Larsen et al. | |
| 2012/0162903 | A1 | 6/2012 | Macdonald et al. | |
| 2013/0271990 | A1 | 10/2013 | Hussell et al. | |
| 2014/0090403 | A1 | 4/2014 | Pearson et al. | |
| 2014/0097722 | A1 | 4/2014 | Jewell-Larsen et al. | |
| 2014/0130675 | A1 | 5/2014 | Marra | |
| 2015/0003015 | A1 | 1/2015 | Kulkarni et al. | |
| 2015/0219874 | A1 | 8/2015 | Figueredo | |
| 2015/0314033 | A1 | 11/2015 | Gurman | |
| 2016/0175850 | A1 | 6/2016 | Peczalski et al. | |
| 2016/0298617 | A1 * | 10/2016 | Thorslund | F04B 19/006 |
| 2016/0377328 | A1 * | 12/2016 | Hurbi | C09K 5/10 62/3.1 |
| 2017/0170688 | A1 | 6/2017 | Maniktala | |
| 2018/0206362 | A1 | 7/2018 | Vadillo et al. | |
| 2019/0050097 | A1 | 2/2019 | Mugiraneza | |
| 2019/0052104 | A1 | 2/2019 | Schlachte et al. | |
| 2019/0217513 | A1 | 7/2019 | Bustle et al. | |
| 2020/0291232 | A1 | 9/2020 | Piotrowski et al. | |
| 2022/0210945 | A1 | 6/2022 | Vadillo et al. | |
| 2022/0320833 | A1 | 10/2022 | Oliverio et al. | |
| 2024/0190254 | A1 | 6/2024 | Jeong et al. | |

FOREIGN PATENT DOCUMENTS

| | | | |
|---|---|---|---|
| JP | 2000222072 | A | 8/2000 |
| JP | 2016219747 | A | 12/2016 |
| JP | 2019506123 | A | 2/2019 |
| JP | 2024051451 | A | 4/2024 |
| JP | 2024514518 | A | 4/2024 |
| KR | 101361036 | B1 | 2/2014 |
| WO | WO-2020223300 | A1 | 11/2020 |
| WO | WO 2022/216475 | A1 | 10/2022 |
| WO | WO-2022212349 | A1 | 10/2022 |
| WO | WO-2022226245 | A1 | 10/2022 |

OTHER PUBLICATIONS

PCT International Search Report and Written Opinion, PCT Application No. PCT/US2022/025845, Jul. 28, 2022, 32 pages.

PCT/US2020/030397 International Search Report and Written Opinion dated Sep. 11, 2020.

PCT/US2020/030397 Invitation to Pay Additional Fees dated Jul. 14, 2020.

PCT/US2022/022311 International Search Report and Written Opinion dated Aug. 30, 2022.

PCT/US2022/022311 Invitation to Pay Additional Fees dated Jun. 24, 2022.

U.S. Appl. No. 17/607,154 Office Action dated May 17, 2024.

U.S. Appl. No. 17/607,154 Office Action dated Nov. 5, 2024.

U.S. Appl. No. 17/735,084 Office Action dated Mar. 26, 2025.

U.S. Appl. No. 17/735,084 Office Action dated Sep. 5, 2025.

JP2023-564513 Office Action dated Jan. 28, 2026, and English translation.

PCT/US2025/049529 International Search Report and Written Opinion dated Jan. 22, 2026.

* cited by examiner

HEAT TRANSFER USING IONIC PUMPS

CROSS-REFERENCE TO RELATED APPLICATION

This application is a continuation of International Application No. PCT/US22/025845, "Heat Transfer Using Ionic Pumps," filed Apr. 21, 2022; which claims priority to U.S. Provisional Patent Application Ser. No. 63/210,887, "Heat Transfer Using Ionic Micro-Pumps," filed Jun. 15, 2021 and to U.S. Provisional Patent Application Ser. No. 63/179,135, "Heat Transfer Using Ionic Micro-Pumps," filed Apr. 23, 2021. The subject matter of all of the foregoing is incorporated herein by reference in their entirety.

BACKGROUND

1. Technical Field

This disclosure relates generally to heat transfer using ionic flow generators (ionic pumps).

2. Description of Related Art

There are many applications for devices that perform heat transfer. At large scales, this may be done with small bladed or screw-type or other mechanical impellors to actively move a working fluid that transfers heat from one location to another for exhaust or radiative dissipation (e.g., car engine radiator systems).

However, it is more difficult when reducing to a micro-scale, with dimensions on the order of a few mm. Traditional state-of-the-art solutions generally do not work at all on such small scales, or are too performance-limited in their ability to remove heat quickly enough from intense heat sources, such as those increasingly found in modern electronic devices.

Thus, there is a need for better approaches for small heat transfer devices.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

In one aspect, heat transfer devices are based on using one or more ionic pumps to circulate a dielectric working fluid around a closed circulation path, which may be contained in a conduit. The working fluid may be a liquid or a gas. The ionic pumps are disposed along the closed circulation path. The pumps include an emitter and collector. When a voltage is applied to the emitter, the working fluid is ionized at the emitter. The ionized fluid is drawn electrostatically to the lower-voltage collector, which, through collision with molecules that in turn impart their momentum, creates a flow of the working fluid. This approach may be used with either positive or negative corona devices. Pumps of this type may be made smaller and with different form factors compared to conventional mechanical pumps. As a result, the overall heat transfer device may be designed to address applications that are not feasible for more conventional pumps.

Figure 1:
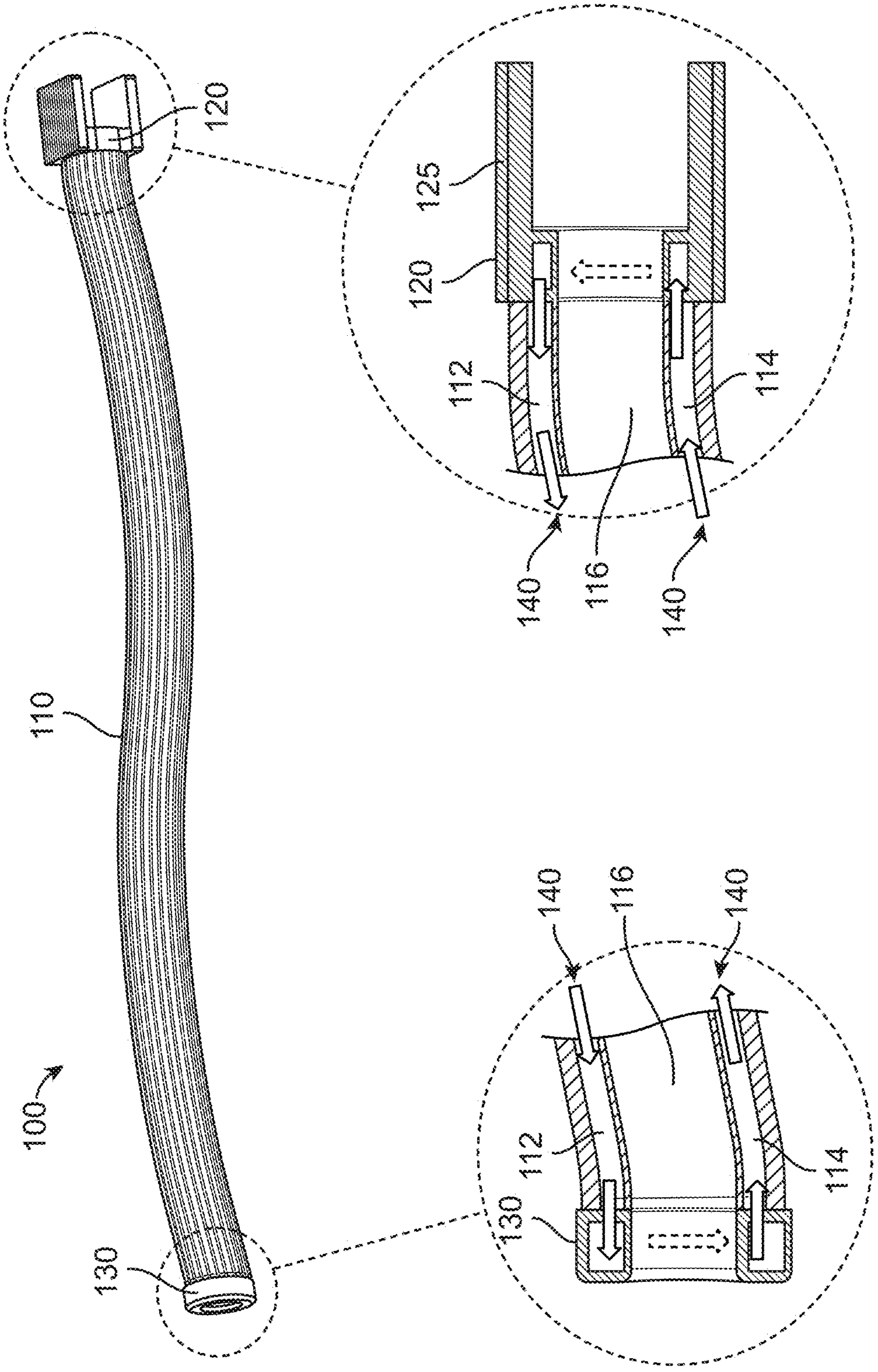
FIG. 1 shows a perspective view of an ionic heat transfer apparatus.

FIGS. 1-6 show an example. In this example, the apparatus includes a conduit for a closed circulation path, in the form of a cable cover with two end caps. FIG. 1 shows a perspective view of the assembled apparatus 100, with the two end caps 120, 130 and cable cover 110 in between. The end caps 120, 130 contain the pumps to circulate the working fluid. One end cap 120 makes thermal contact with the heat source, which in this example is electronics. The other end cap 130 closes the circulation path.

FIG. 1 also shows magnified cross-sectional views of the two end caps 120, 130. The right end cap 120 contains pumps (not shown in FIG. 1) and is also integrated with a heat sink 125. The heat source (not shown in FIG. 1) makes thermal contact with this end cap 120, transferring heat to the working fluid. As indicated by the arrows, the working fluid 140 circulates from the right end cap 120, down the length of the cable cover along one channel 112, through the left end cap 130, and back up the length of cable cover along a different channel 114, and back through the right end cap 120. The left end cap 130 is a return, that also contains pumps. The center 116 of the cable cover is hollow, so that cables may be routed to the electronics.

Figure 2:
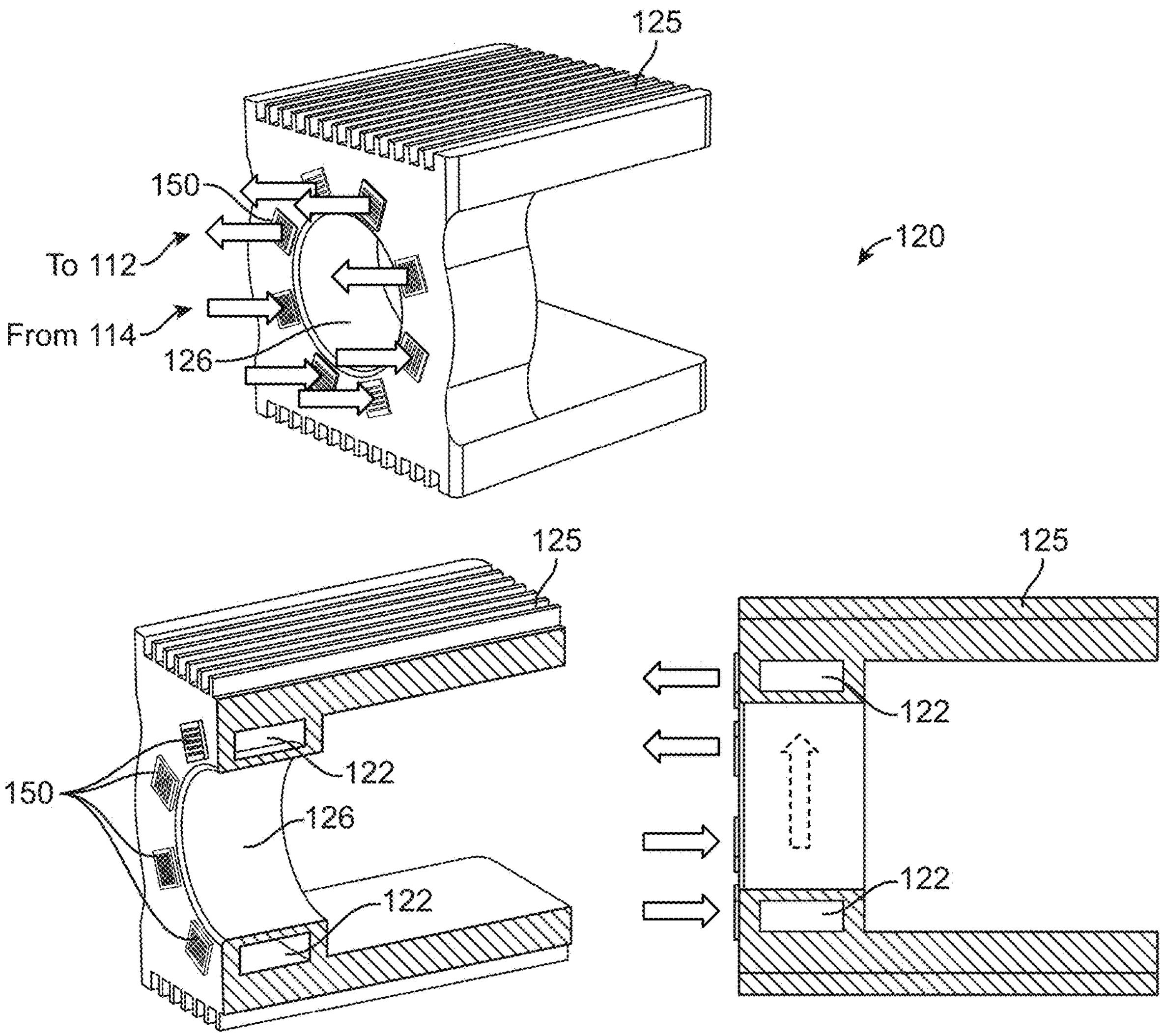
FIGS. 2 and 3 show different views of the two end caps of the ionic heat transfer apparatus of FIG. 1.

FIG. 2 shows different views of the end cap 120 on the heat source side. The top left is a perspective view of the end cap 120. The bottom left is a sectioned perspective view. The bottom right is a cross-sectional side view. The end cap 120 contains eight ionic pumps 150, which are shown as small squares, with an arrow entering or exiting each pump in the top perspective view. The end cap 120 has an annular cavity 122. In FIG. 2, the bottom four pumps 150 pump the working fluid from channel 114 into the cavity 122, and the top four pump fluid out of the cavity into channel 112, as shown by the arrows. The end cap is integrated with a heat sink 125. The circulation path for the working fluid is contained in the base of the heat sink 125. The center hole 126 allows cables to pass through.

Figure 3:
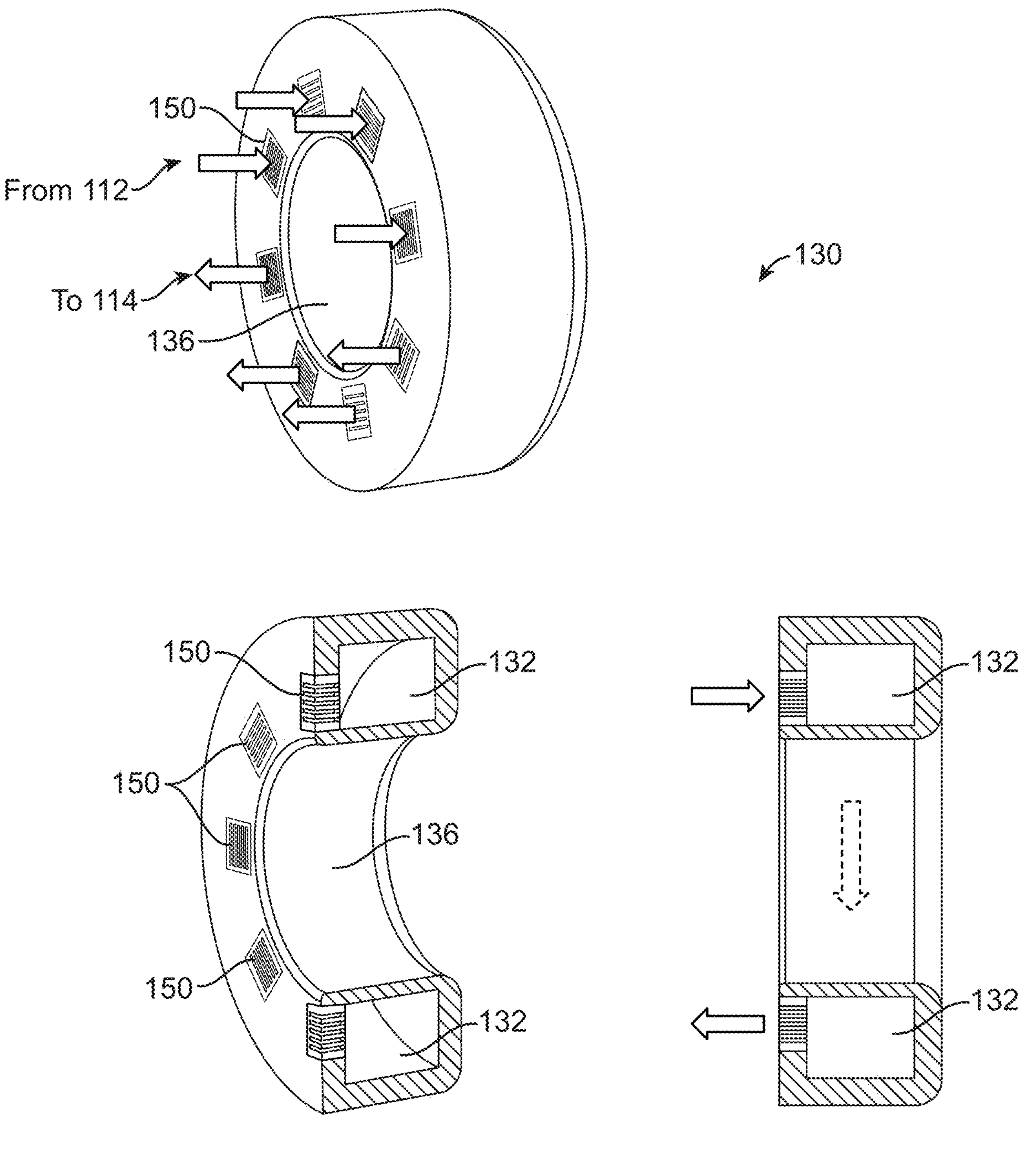

FIG. 3 shows the end cap 130 on the return side. The views in FIG. 3 are the same as in FIG. 2: perspective view, sectioned perspective view and cross-sectional side view. The end cap is rotated 180 degrees relative to the orientation in FIG. 1, so that the ionic pumps 150 are visible. The end cap 130 also contains eight ionic pumps 150 that pump fluid into and out of an annular cavity 132. In FIG. 3, the top four pumps 150 pump the working fluid from channel 112 into the cavity 132, and the bottom four pump fluid out of the cavity into channel 114, as shown by the arrows. Cables may pass through the center hole 136.

Figure 4:
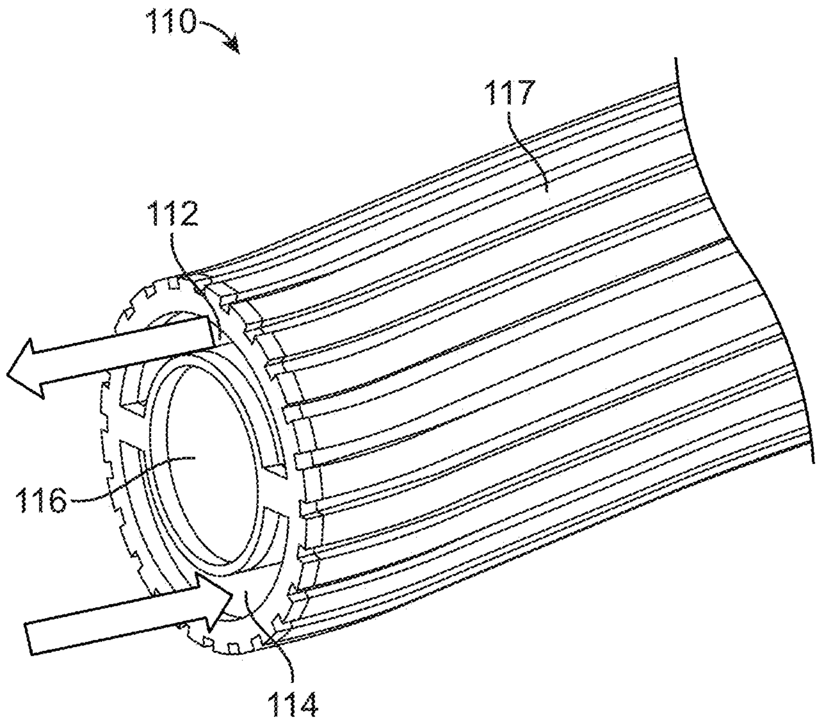
FIG. 4 shows the cable cover conduit of the ionic heat transfer apparatus of FIG. 1.

FIG. 4 shows the cable cover conduit 110. As shown in the cross section, the central opening 116 is where the cable goes. The annulus outside of the center opening 116 is divided into two chambers or channels 112, 114. Fluid flows from the heat source to sink along one channel 112 and in the reverse direction along the other channel 114, as shown by the arrows. The cable cover also includes heat radiating ribs 117 to dissipate heat.

Figure 5:
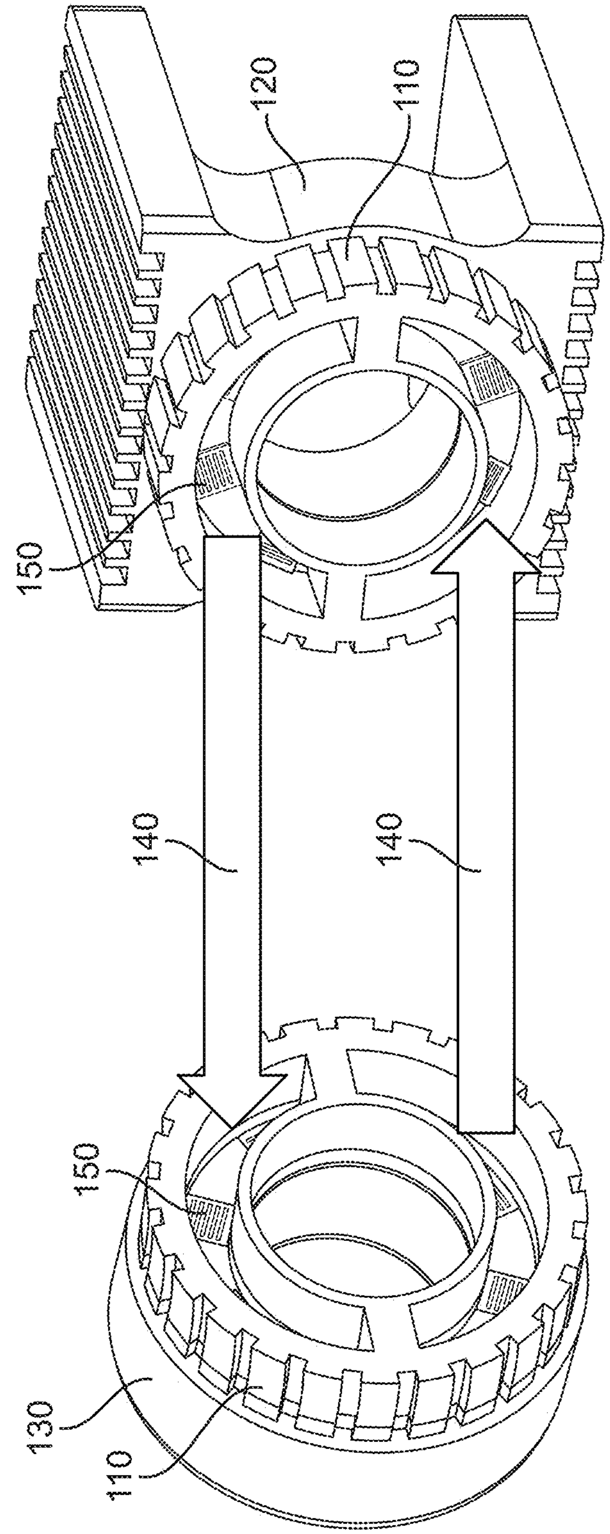
FIG. 5 shows perspective views of the two end caps with cable cover.

FIG. 5 shows magnified views of the two end caps 120, 130 with a short section of cable cover 110 to show the circulation path across the boundary of these components. Some pumps 150 are also visible.

Figure 6:
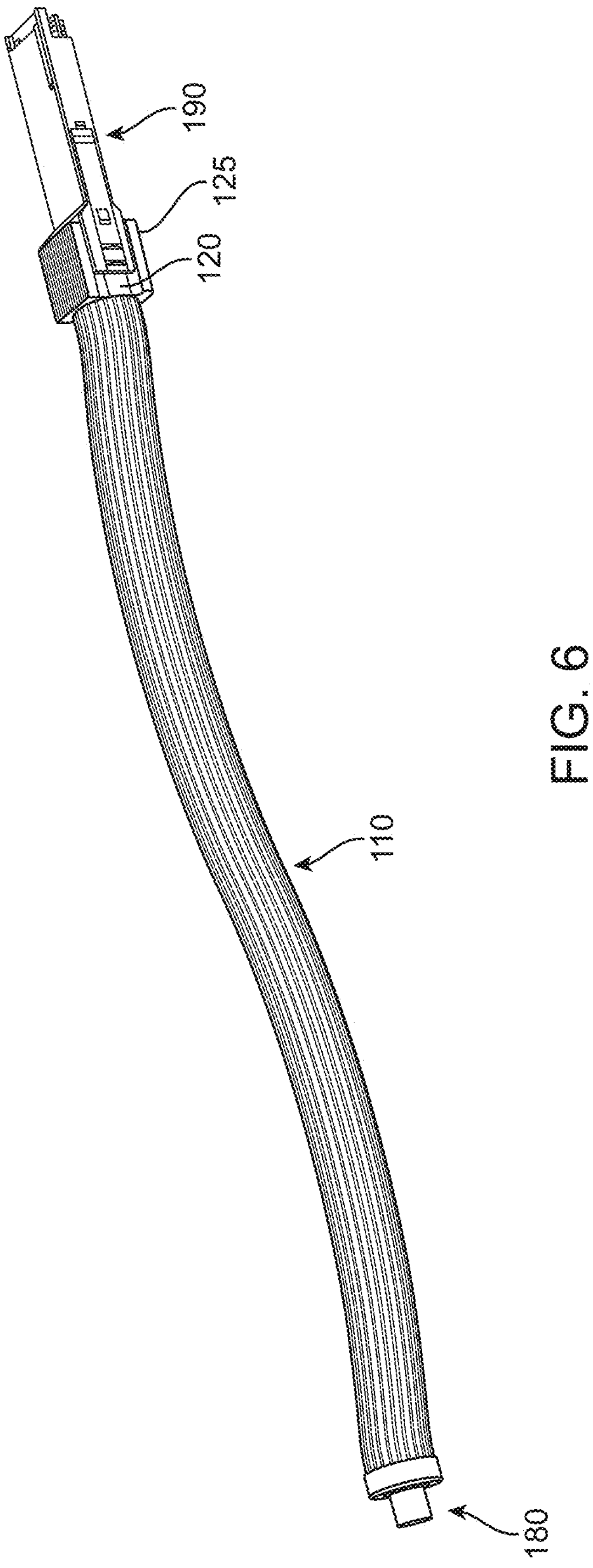
FIG. 6 shows a perspective view of the ionic heat transfer apparatus with attached electronics.

FIG. 6 shows a perspective view of the apparatus, with electronics 190 contacting the heat sink 125 and end cap 120 and also with the cable 180 inserted into the cable cover 110. Heat is transferred from the electronics 190 to the heat sink 125 for dissipation. Heat is also transferred to the working fluid which circulates through the cable cover 110 to dissipate the heat.

Figure 7:
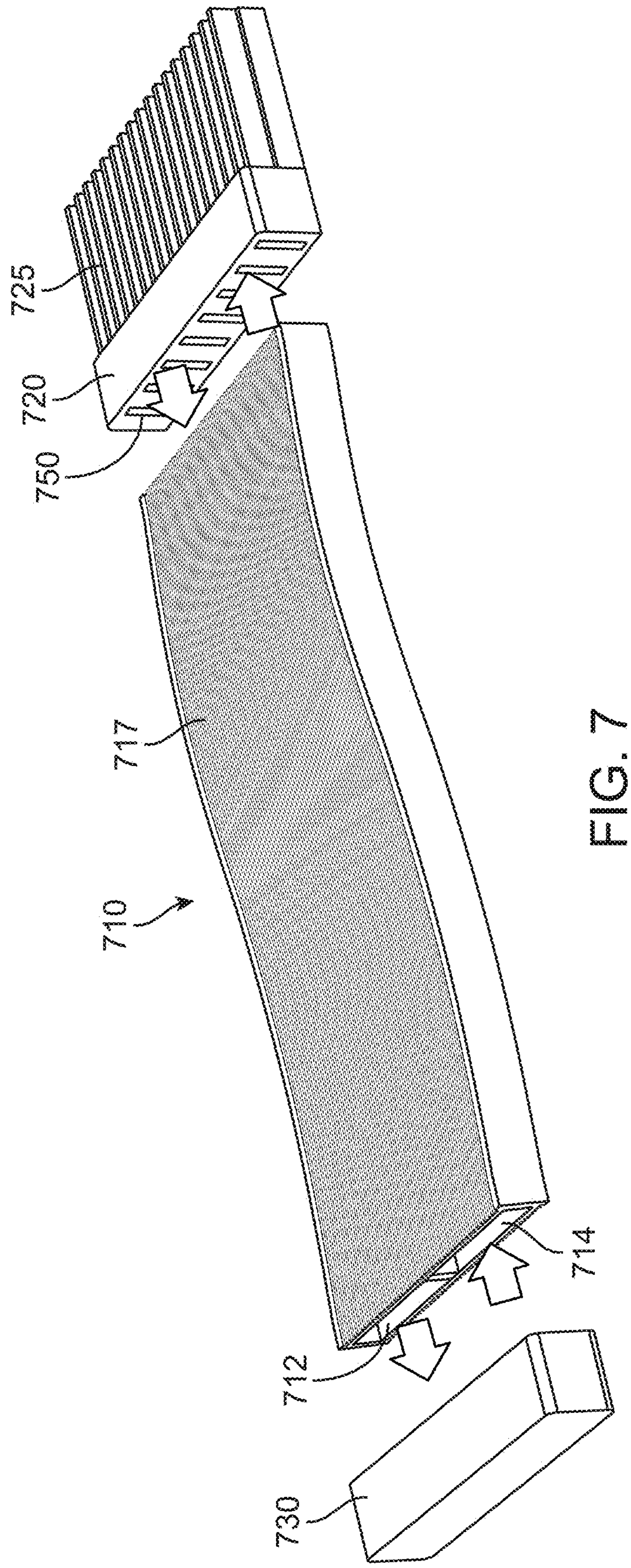
FIG. 7 shows a perspective view of another ionic heat transfer apparatus.

FIG. 7 shows an alternate design in which the main section of the conduit is flat, rather than round. This design includes a flat main conduit section 710, and two end caps 720, 730. Conduit 710 has two channels 712, 714. Both end caps 720, 730 contain ionic pumps 750 to circulate the working fluid. One end cap 720 makes thermal contact with the heat source and also includes an integrated heat sink 725. The other end cap 730 closes the circulation path. The working fluid circulates through end cap 720, down through channel 712, through end cap 730, and back up through channel 714, as shown by the arrows in FIG. 7. The conduit 710 has fins 717 to dissipate heat from the working fluid. The walls of the conduit 710 could dissipate heat by convection or radiation, even without fins.

The designs shown in FIGS. 1-7 are merely examples. It will be understood that other designs will be apparent. For example, the ionic pumps do not have to be located in the end caps. They could be disposed at other locations along the closed circulation path, for example along the length of the cable cover 110 or conduit 710. The conduits could be different sizes, lengths, shapes and cross-sections. They could also be made from different materials: plastic or metal for example. They could be either rigid or flexible. In some cases, they may be RF transparent. Different working fluids may be used, including both liquids and gases. Examples of liquids include Flourinert, deionized water, hydrofluorocarbons and refrigerants. Examples of gases include inert gases, noble gases, helium, nitrogen, argon, neon, krypton and xenon. In some cases, the working fluid has a dynamic viscosity of not more than 5 centiPose (cP) and/or a temperature thermal conductivity of at least 0.02 W/mK.

Figure 8:
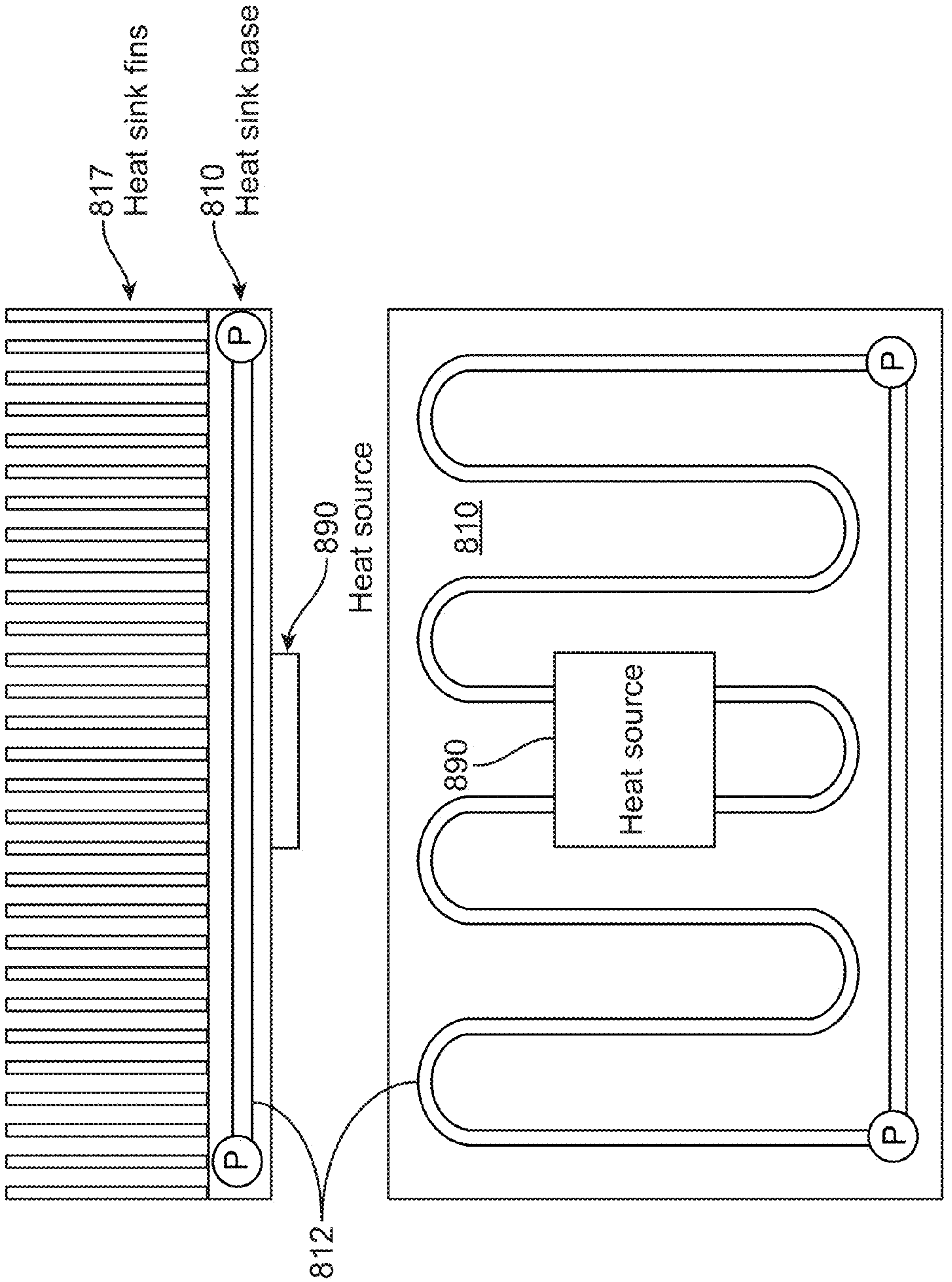
FIG. 8 shows a side view and bottom view of another ionic heat transfer apparatus.

FIG. 8 shows an alternate design in which the closed circulation path is located in the base of a heat sink. FIG. 8 shows a side view and a bottom view of this design. A heat source 890 (e.g., an integrated circuit) is mounted to the base 810 of a heat sink. The heat sink has fins 817 to dissipate the heat. In the base of the heat sink, there is a closed circulation path 812. A working fluid flowing through the circulation path 812 provides a more uniform temperature in the base of the sink, thus reducing the spreading resistance. Ionic pumps, marked by circle P's, move the fluid around the circulation path 812. In the example of FIG. 8, the black paths are the closed circulation path 812 and the circle P's are the ionic pumps.

The circulation path(s) 812 can be implemented in many different ways. There may be a single path with a single active pump, or there may be a single path with multiple pumps. Alternatively, there may be multiple paths, with each closed circulation path having one or more pumps. The circulation path(s) may have different shapes, and the ionic pump(s) may be placed at different locations along the paths. One advantage of using ionic pumps is that the pumps are small enough that they may be built into the heat sink base 810, although that is not required.

Figure 9:
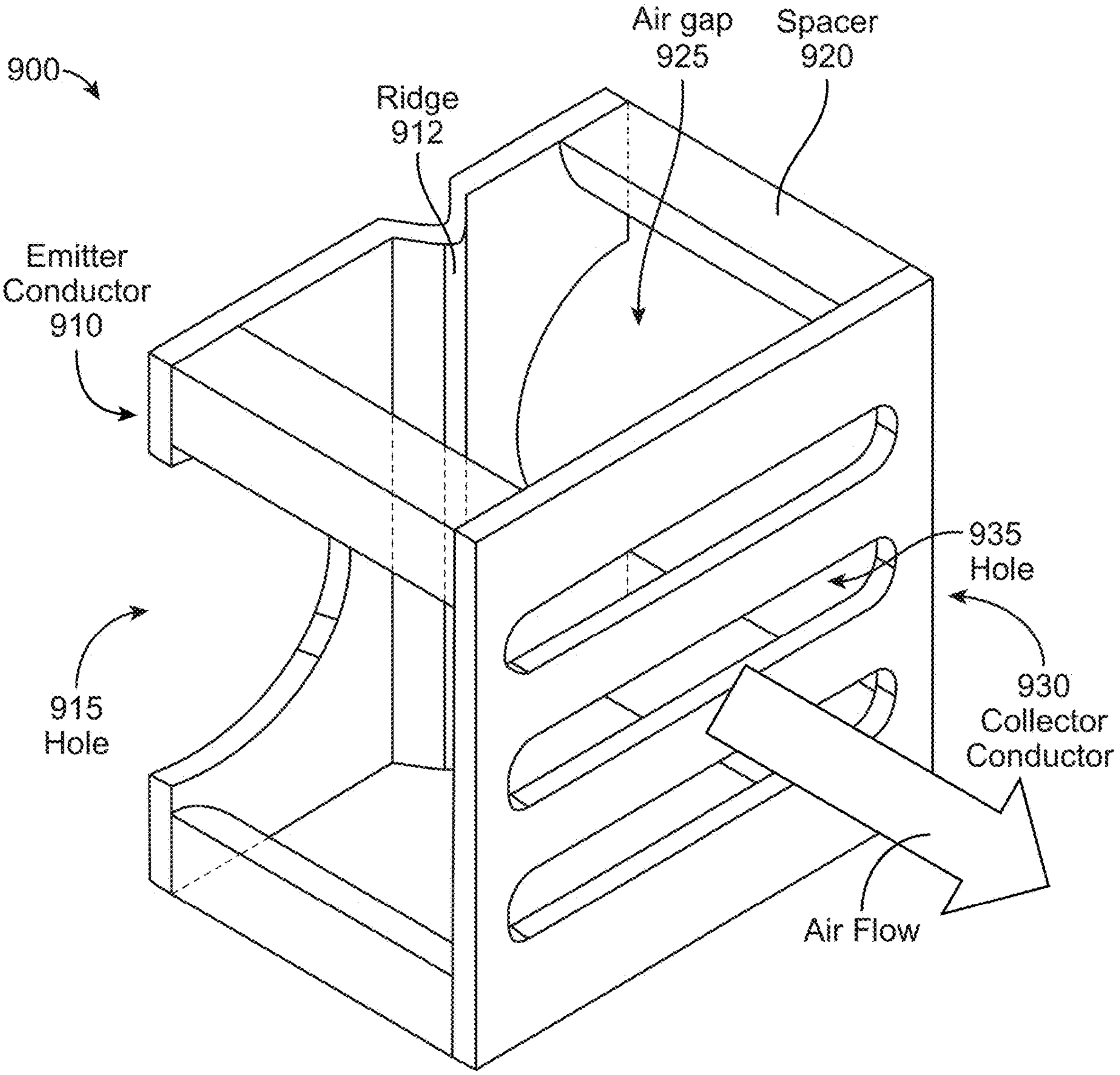
FIG. 9 is a perspective view of a unit cell used to construct an ionic pump.
Figure 10:
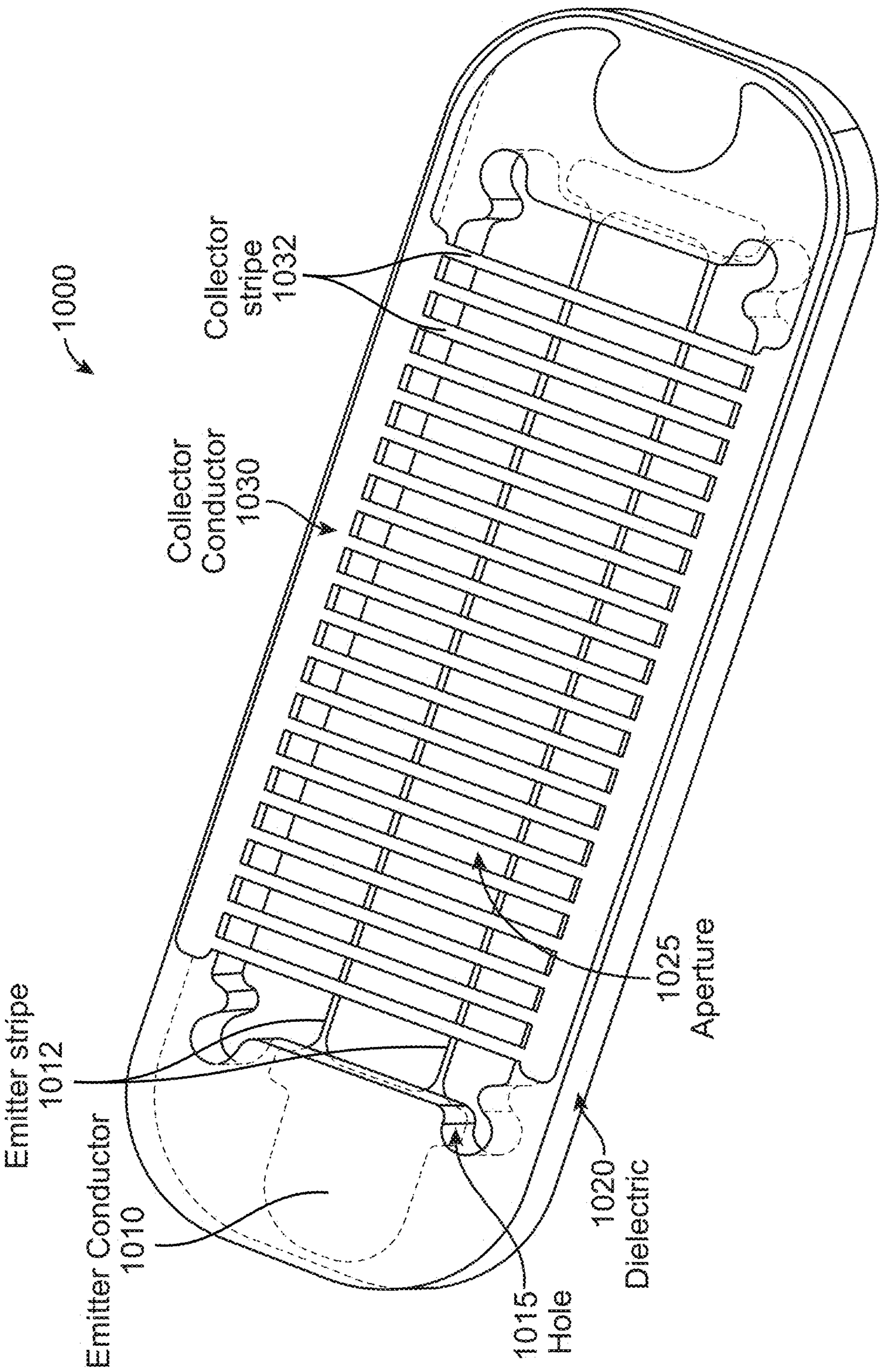
FIG. 10 is a perspective view of another ionic pump.

FIGS. 9-10 describe example designs of ionic pumps that may be used for the heat transfer devices described above. In the following, ionic pumps may be referred to ionic flow generators or ionic air flow generators (when the fluid is air). In these examples, the working fluid is air, but they are not limited to air.

In one aspect, the emitter and/or collector of an ionic air flow generator are formed by conductors joined to a dielectric substrate, such as by metal deposited on a glass or ceramic substrate. One conductor, which is shaped to form the high-voltage emitter with sharp edges or other features to concentrate charge, is joined to one side of the dielectric substrate. Another conductor, which is shaped to form the grounded low-voltage collector with rounded edges that reduce field concentration, is joined to the opposite side of the dielectric substrate. The dielectric substrate is not solid between the emitter and collector. It is shaped with voids that form an air gap between the emitter and collector. Thus, when a voltage is applied to the emitter, air is ionized at the emitter. The ionized air is drawn electrostatically to the grounded collector, which, through collision with neutral molecules that in turn impart their momentum, creates a flow of air through the air gap. This approach may be used with either positive or negative corona devices.

For example, the dielectric substrate may start as a solid piece of glass or ceramic substrate. The surfaces of the substrate may be etched, scored or otherwise pre-conditioned. Conductors are deposited on opposite sides of the substrate. The surface shape of the substrate may be used to form structures in the conductors, such as sharp edges for the emitter or rounded edges for the collector. Dielectric between the conductors is removed, creating an air gap for air flow.

In one approach, sharp-edged groove(s) are made in one side of the substrate. Depositing the conductor into the grooves then forms ridges in the conductor, which functions as the emitter. Conductive material is also deposited on the other side of the substrate and patterned using standard lithography processes, thus forming the collector. After the conductors are deposited, substrate material between the conductors may be removed to create a path for air flow between the emitter and collector.

In a different approach, smooth, concave grooves are made in the substrate, and depositing the conductor into the groove then forms rounded surfaces in the conductor, which functions as the collector. Conductor is also applied to the opposite side with standard lithography techniques and shaped to form sharp edges, such as from a square cross section. This then functions as the emitter. After the conductors are deposited, substrate material between the conductors may be removed to create a path for air flow between the emitter and collector.

FIG. 9 shows an example of an ionic air flow generator. FIG. 9 is a perspective view of a unit cell 900 used to construct the air flow generator. In this example, the unit cell has an area of 1 mm×1 mm, and a thickness of slightly less than 1 mm. Air flow generators of different sizes may be constructed by assembling arrays of these units cells. The unit cell 900 includes two conductors 910 and 930, separated by a dielectric substrate which takes the form of spacers 920 in the final device. During construction, the two conductors 910, 930 are deposited onto a solid dielectric substrate, such as a glass or ceramic substrate. Dielectric is removed to create an air gap 925 between the two conductors 910, 930. The conductors 910, 930 include an emitter and collector, respectively. Some of the dielectric substrate remains to form the spacers 920, which maintains a consistent spacing for the air 925 gap between the emitter and collector.

Conductor 910 is predominantly flat. The flat surface areas in the corners of this unit cell for conductor 910 are joined to the spacers 920. The conductor 910 is also shaped to function as an emitter. It typically includes features that concentrate charge, such as points or edges. In this example, the conductor 910 is formed with a ridge 912 that has a sharp edge, which functions as the emitter. The radius of curvature of the ridge preferably should be as tight as possible, and preferably not larger than 30 um. This example uses a line-plane geometry. Other types of linear raised structures may also be used. If the emitter were formed as raised point structures (such as cones or pyramids), rather than raised linear structures (such as ridges), that would implement a point-plane geometry. Raised point structures preferably should also have feature sizes and curvature radii not larger than 30 um. Conductor 910 also includes holes 915 to allow air flow.

Conductor 930 is also predominantly flat and the flat surface areas in the corners of this unit cell of conductor 930 are joined to the spacers 920. The conductor 930 is shaped to form a collector, typically avoiding features with points or edges. It also includes holes 935 to allow air flow. The holes 935 are designed to avoid corners and edges. The holes 935 are pill-shaped with rounded ends, rather than rectangular with corners. The edges of the holes are also rounded, particularly the edges on the side facing the emitter. Preferably, they have less curvature than the emitter ridge. This reduces the risk of unwanted arcing or breakdown.

FIG. 10 is a perspective view of another design for an ionic fluid flow generator pump. This device 1000 includes two conductors 1010 and 1030, separated by a dielectric 1020. During construction, the two conductors 1010, 1030 are deposited onto a solid dielectric substrate, such as a glass or ceramic substrate. In FIG. 10, the collector conductor 1030 is on the top surface of the dielectric 1020, and the emitter conductor 1010 is on the bottom surface of the dielectric 1020. Dielectric is removed to create an aperture 1025 in the dielectric substrate. Conductor 1010 includes an emitter with one or more emitter stripes 1012 suspended across the aperture 1025. In this example, there are two emitter stripes. Conductor 1030 includes a collector with multiple collector stripes 1032, also suspended across the aperture 1025. The aperture 1025 includes isolation notches 1015, which increase the creep distance between the emitter and collector.

In this example, both the emitter stripes 1012 and the collector stripes 1032 are supported by the dielectric 1020 only on the two ends of the stripes after the dielectric material has been removed. There are no mid-stripe supports. However, the length of the stripes is short enough that there is no appreciable sag, and the dielectric 1020 maintains a consistent spacing for the air gap 1025 between the emitter stripes 1012 and collector stripes 1032. In alternate designs, the emitter and/or collector stripes may be supported, for example by forming a conductive trace supported along its entire length by a stripe of underlying dielectric. In the design of FIG. 10, the emitter stripes and collector stripes are arranged in a regular pattern, and they are oriented perpendicular to each other.

The collector stripes 1032 are rounded to avoid concentrating the electric field. In one approach, they are fabricated by scoring rounded grooves into the substrate. Metal is applied to both sides of the dielectric 1020. The metal deposited into the rounded grooves is patterned by etching, thus forming the rounded collector stripes 1032. The metal deposited on the opposite surface of the dielectric 1020 is patterened by etching to create sharp edges, thus forming the emitter stripes 1012.

The resulting collector stripes 1032 have cross sections without corners or, at least the surfaces facing the emitter are rounded. In contrast, the emitter stripes 1012 are formed with edges. In one approach, standard lithography is used to pattern the emitter stripes 1012 on the dielectric substrate. The resulting cross section is typically rectangular or trapezoidal, with corners. The corners preferably have a radius of curvature not greater than 30 um.

In other examples, embodiments of a similar structure may include two substrates with respective conductors created separately, and joined together as a subsequent step, or constructed such that air flow is routed in a lateral direction across the surface of the insulative substrate rather than through perforations in the substrate or in the applied conductors.

Further details and examples of ionic pumps are provided in International Application No. PCT/US22/22334, "Ionic Air Flow Generator," filed Mar. 29, 2022, which is incorporated by reference herein in its entirety.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. An ionic heat transfer apparatus comprising:

a conduit containing a closed circulation path, wherein the conduit is configured to make thermal contact with a heat source;

a dielectric working fluid in the closed circulation path; and a plurality of ionic pumps disposed along the closed circulation path, wherein the plurality of ionic pumps are configured to ionize the working fluid, to circulate the working fluid around the closed circulation path, wherein circulation of the working fluid transfers heat away from the heat source, wherein each ionic pump of the plurality of ionic pumps has a cross- sectional flow area of not more than 4 $mm^2$, and wherein the conduit is an elongate conduit comprising two channels between a first end and a second end of the conduit, wherein at least one first ionic pump of the plurality of ionic pumps is configured to circulate the working fluid through a first channel of the two channels in one direction along the conduit, wherein at least one second ionic pump of the plurality of ionic pumps is configured to circulate the working fluid through a second channel of the two channels in an opposite direction along the conduit, wherein one of the first end and the second end makes thermal contact with the heat source, wherein circulation of the working fluid transfer heat away from the heat source, wherein the at least one first ionic pump is disposed at the first end of the conduit, and wherein the at least one second ionic pump is disposed at the second end of the conduit.

2. The ionic heat transfer apparatus of claim 1, wherein the conduit has a surface structure configured to radiatively or convectively dissipate heat from the working fluid.

3. The ionic heat transfer apparatus of claim 2, wherein the surface structure comprises fins.

4. The ionic heat transfer apparatus of claim 1, wherein the conduit is flexible.

5. The ionic heat transfer apparatus of claim 1, wherein the conduit is RF transparent.

6. The ionic heat transfer apparatus of claim 1, wherein the working fluid has a dynamic viscosity of not more than 5 Centipoise (cP).

7. The ionic heat transfer apparatus of claim 1, wherein the working fluid has a room temperature thermal conductivity of at least 0.02 W/mK.

8. The ionic heat transfer apparatus of claim 1, wherein the working fluid includes perfluorocarbons, deionized water, a hydrofluorocarbon, or a refrigerant.

9. The ionic heat transfer apparatus of claim 1, wherein the working fluid is an inert gas, a noble gas, helium, nitrogen, argon, neon, krypton, or xenon.

10. The ionic heat transfer apparatus of claim 1, wherein the heat source comprises a heat sink.

11. The ionic heat transfer apparatus of claim 1, wherein the conduit comprises an end cap containing at least one of the plurality of ionic pumps.

12. The ionic heat transfer apparatus of claim 1, wherein the conduit comprises one or two end caps that contain the plurality of ionic pumps.

13. The ionic heat transfer apparatus of claim 1, wherein at least one of the plurality of ionic pumps is disposed along a length of the conduit.

14. The ionic heat transfer apparatus of claim 1, wherein the conduit comprises a cable cover.

15. The ionic heat transfer apparatus of claim 1, wherein at least one of the ionic pumps comprises:

a dielectric substrate having a first side and an opposing second side and an aperture through the dielectric substrate;

a first conductor comprising an emitter with one or more emitter stripes, wherein each emitter stripe of the one or more emitter stripes is suspended across the aperture through the dielectric substrate and has two ends deposited on and supported by the first side of the dielectric substrate; and a second conductor comprising a collector with multiple collector stripes, wherein each collector stripe of the multiple collector stripes is suspended across the aperture through the dielectric substrate and has two ends deposited on and supported by the opposing second side of the dielectric substrate;

wherein the dielectric substrate maintains a gap between the emitter and the collector, wherein the emitter is configured to ionize the working fluid when a voltage is applied to the emitter, and wherein the collector is configured to draw the ionized working fluid to the collector, thereby creating a flow of working fluid through the gap.

16. The ionic heat transfer apparatus of claim 15 wherein:

the two ends of each of the one or more emitter stripes comprise patches that are deposited on and supported by the first side of the dielectric substrate on opposite sides of the aperture, wherein each of the patches on opposite sides of the aperture are electrically connected to each other and to the emitter, the two ends of each of the multiple collector stripes comprises patches that are deposited on and supported by the opposing second side of the dielectric substrate on opposite sides of the aperture, and the patches on opposite sides of the aperture are electrically connected to each other and to the collector.

17. The ionic heat transfer apparatus of claim 1, wherein at least one of the ionic pumps comprises:

a dielectric having a first side;

a conductor joined to and supported by the first side of the dielectric, the conductor also shaped to form a first electrode comprising either an emitter or a collector; and a second electrode comprising the other of the emitter and the collector, wherein the emitter and the collector are positioned opposing each other, and wherein the emitter is configured to ionize the working fluid at the emitter when a voltage is applied to the emitter and wherein the collector is configured to draw the ionized working fluid to the collector, thereby creating a flow of the working fluid.

18. The ionic heat transfer apparatus of claim 1, wherein at least one of the ionic pumps comprises:

a dielectric frame;

a conductor joined to and supported by the dielectric frame, the conductor also shaped to form a first electrode comprising either an emitter or a collector; and a second electrode comprising the other of the emitter and the collector, wherein the emitter and the collector are positioned opposing each other, and wherein the emitter ionizes the working fluid at the emitter when a voltage is applied to the emitter, and wherein the collector is configured to draw the ionized working fluid to the collector, thereby creating a flow of the working fluid.

19. An ionic heat transfer apparatus comprising:

a conduit containing a closed circulation path, wherein the conduit is configured to make thermal contact with a heat source;

a dielectric working fluid in the closed circulation path; and a plurality of ionic pumps disposed along the closed circulation path, wherein the plurality of ionic pumps are configured to ionize the working fluid to circulate the working fluid around the closed circulation path, wherein circulation of the working fluid transfers heat away from the heat source, wherein the working fluid includes an operative amount of helium, nitrogen, neon, krypton, or xenon, wherein each ionic pump of the plurality of one or more ionic pumps has a cross- sectional flow area of not more than 4 $mm^2$, wherein the conduit is an elongate conduit comprising two channels between a first end and a second end of the conduit, wherein at least one first ionic pump of the plurality of ionic pumps is configured to circulate the working fluid through a first channel of the two channels in one direction along the conduit, wherein at least one second ionic pump of the plurality of ionic pumps is configured to circulate the working fluid through a second channel of the two channels in an opposite direction along the conduit, wherein one of the first end and the second end makes thermal contact with the heat source, wherein circulation of the working fluid transfer heat away from the heat source, wherein the at least one first ionic pump is disposed at the first end of the conduit, and wherein the at least one second ionic pump is disposed at the second end of the conduit.

* * * * *